United States Patent [19]

Lee

[11] Patent Number: 4,506,219

[45] Date of Patent: Mar. 19, 1985

[54] BOREHOLE TOOL OUTRIGGER ARM DISPLACEMENT CONTROL MECHANISM

[75] Inventor: Arley G. Lee, Pasadena, Tex.

[73] Assignee: Schlumberger Technology Corporation, Houston, Tex.

[21] Appl. No.: 403,608

[22] Filed: Jul. 30, 1982

[51] Int. Cl.³ .................... G01N 27/72; E21B 17/10; G01R 33/00

[52] U.S. Cl. .................... 324/221; 166/241; 175/325; 250/268; 324/346

[58] Field of Search .............. 324/323, 333, 347, 355, 324/338, 346, 367, 374, 220, 221; 166/217, 241; 175/325; 250/268; 73/151, 152

[56] References Cited

U.S. PATENT DOCUMENTS

| | | | |
|---|---|---|---|
| 2,258,052 | 10/1941 | Hall | 166/241 X |
| 2,688,115 | 8/1954 | Hildebrandt | 324/347 |
| 3,267,366 | 8/1966 | Bricaud | 324/221 |
| 3,940,689 | 2/1976 | Johnson | 324/221 |
| 3,973,181 | 8/1976 | Calvert | 324/355 |

Primary Examiner—Gerard R. Strecker

[57] ABSTRACT

As the outrigger arms of a borehole logging tool are flexed inwardly and outwardly according to the diameter of the borehole opening through which they pass, the corresponding axial displacements of the ends of the arms are controlled to determine the axial positions of the arms relative to the tool. Specifically, as the arm ends move, they are caused to rotate by a cam mechanism. The stiffness of the arms causes the arm ends to rotate in unison, and the exact positions of the arms on the tool are then controlled by the differential movements of the arm ends in the cams.

21 Claims, 5 Drawing Figures

U.S. Patent  Mar. 19, 1985  Sheet 1 of 2  4,506,219
FIG.1
FIG.2
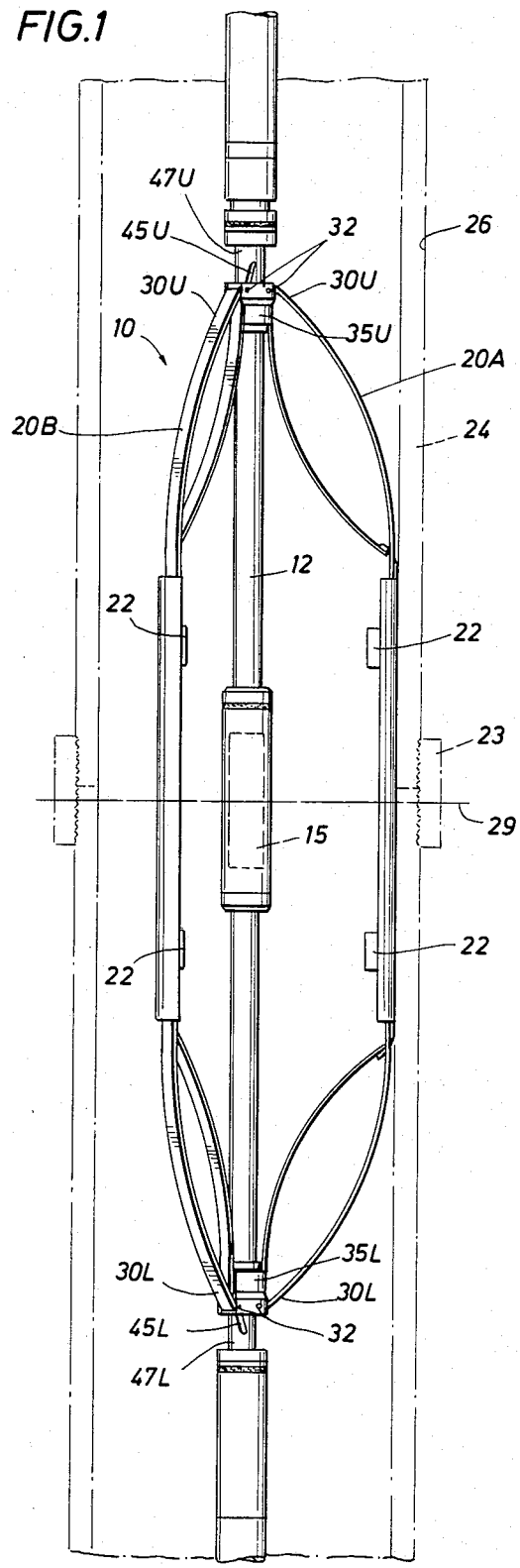
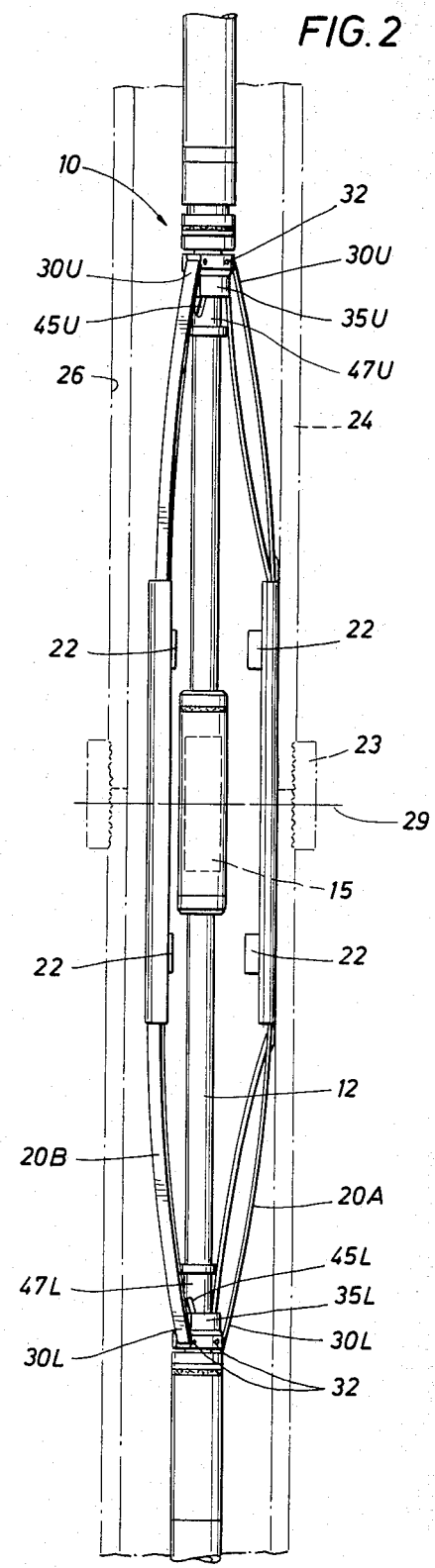

BOREHOLE TOOL OUTRIGGER ARM DISPLACEMENT CONTROL MECHANISM

BACKGROUND OF THE INVENTION

The present invention relates to borehole logging, and more particularly to borehole logging methods and tools having one or more extendable and retractable outrigger arms attached to the tool. Such arms may be used for determining the diameter of the borehole through which the tool is moving, for centering or eccentering the tool in the borehole, and/or for carrying tool components outwardly from the main body of the tool itself.

To provide for passage through wellbores, casing, tubing, and so forth, of different diameters, such outrigger arms are usually fabricated as cantilevered arms or as outwardly-bowed, stiff, flexible, springs. In the more common bowspring outrigger arm arrangement, both ends of each arm are anchored to the main tool body. At least one end of each arm is then allowed to shift or to slide axially along the tool whenever the effective diameter of the arm changes in response to changes in the diameter of the borehole. This means, of course, that the exact axial position or relationship of the arm relative to the tool will change according to the effective arm diameter. In some tools and applications, this can be a distinct disadvantage.

For example, in many casing-collar locator tools, pairs of permanent magnets are carried on the outrigger arms to produce a magnetic bucking field adjacent the steel casing in a borehole. Centered beneath these magnets is a coil which detects changes in the magnetic bucking field as the tool passes casing collars while moving through the casing. This very accurately determines the exact depth of the tool in the wellbore. However, since the exact axial positions of the arms relative to the tool are a function of the radial extension of the arms, there will usually be but only one effective diameter for which the magnets are positioned exactly over the centerline of the coil. At other diameters, the configuration is less than optimal.

For certain borehole tools having radially extendable and retractable outrigger arms, therefore, a need exists for a displacement control mechanism for regulating and controlling the axial displacement of each of the outrigger arms relative to the tool such that a defined relationship will be produced for each effective arm extension from the tool.

SUMMARY OF THE INVENTION

Briefly, the present invention meets the above needs and purposes with a unique displacement control mechanism for regulating and controlling the axial displacement of each outrigger arm relative to the tool as the arm's effective extension from the tool changes. This is accomplished, in part, by securing the ends of the arm to the tool so that, as the arms are radially extended and retracted relative thereto, the corresponding axial displacements of one or both of the arm ends cause predetermined rotations thereof about the exterior of the tool. More specifically, the movements of the arm ends in the preferred embodiment are determined by cam and race mechanisms, with the amount that each arm end rotates about the tool for a given axial displacement being determined by the slope of the corresponding cam race. The arms are also fashioned and strengthened transversely to be sufficiently stiff to resist twisting spirally about the tool. Therefore, the arms remain axially extended and aligned so that both ends rotate about the tool substantially in unison, thereby synchronizing the arm end rotations. The precise axial position of each arm along the tool for any radial extension, therefore, will be the combined result of the respective arm end displacements furnished by each cam race for the corresponding rotation thereof relative to the tool body.

For example, in the illustrated preferred embodiment of the invention in which a casing collar locator has magnets centered on the outrigger arm, the cam race slopes are equal and oppositely handed to produce equal and opposite axial movements of the arm ends and a net zero displacement of the center of each arm. This keeps the magnets centered over the detection coil. Similarly, in other tools, differences between the two cam race slopes can be used to produce other controlled axial arm movements according to the needs at hand. The invention thus provides for precisely tailoring the axial displacements as desired.

It is therefore an object of the present invention to provide a new and improved displacement control method and mechanism for radially extendable and retractable outrigger arms; to provide such a control wherein the precise axial displacement of the outrigger arms relative to the tool may be controlled automatically as a function of each arm's effective extension from the tool; in which the displacements are coordinated by causing the ends of each arm to rotate about the tool substantially in unison in response to changes in the radial extension thereof, and hence of the axial positions of the arm ends, producing defined axial displacements of each arm for each radial extension thereof; and to accomplish the above objects and purposes in an uncomplicated, reliable, durable, efficient, and versatile method and mechanism suitable for use in the widest possible variety of borehole applications.

Other objects and advantages of the invention will be apparent from the following description, the accompanying drawings and the appended claims.

BRIEF DESCRIPTION OF THE DRAWINGS

FIGS. 1 and 2 show a borehole tool with outrigger arms extended and retracted, respectively, and under the control of the displacement control mechanism of the present invention;

DESCRIPTION OF THE PREFERRED EMBODIMENT

Figure 5:
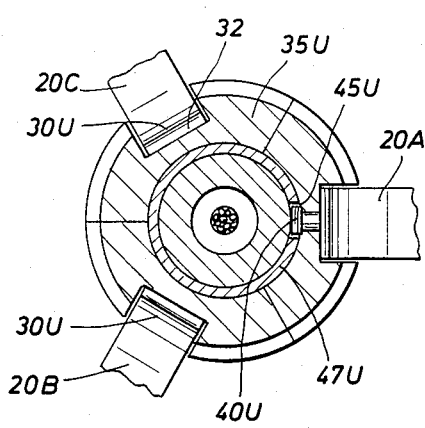
FIG. 5 is a fragmentary cross-sectional view taken on line 5—5 in FIG. 3, showing details of the cam race, cam, and mounting collar.

With reference to FIGS. 1 and 2, there is shown a borehole tool 10. As illustrated, tool 10 is a casing collar locator tool having a mandrel 12 containing a detection coil 15. Carried on a plurality of outrigger arms 20A, B, and C (cf. FIG. 5), are pairs of magnets 22 for producing a magnetic bucking field for detecting casing collars 23 connecting sections of casing 24 in the borehole 26. The magnets 22 are shown symmetrically about the centerline 29 of the arms 20, this centerline also passing through the center of the coil 15 as further described below.

The respective longitudinally displaced arm ends 30U and 30L are pivotally connected at 32 to respective longitudinally or axially displaceable collars 35U and 35L. The collars 35 are axially moveable along the mandrel 12 in response to radial extension and retraction of the outrigger arms 20 (cf. FIGS. 1 and 2). In this embodiment, all the arms share a common collar 30U at the upper ends and a common collar 30L at the lower ends.

Figure 3:
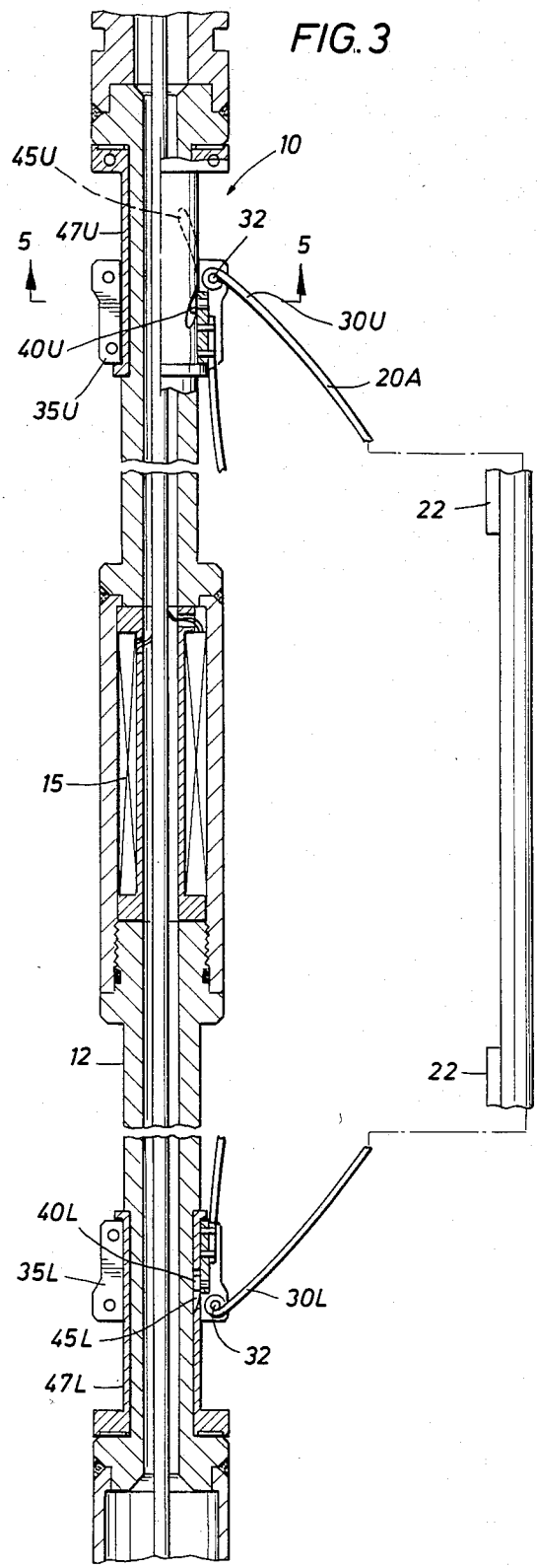
FIG. 3 is a partial cross-sectional view of the tool shown in FIGS. 1 and 2, revealing details of the cam race mechanism.
Figure 4:
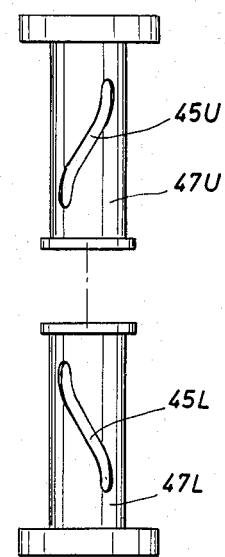
FIG. 4 is a plan view of the two cam races of the tool.

To regulate the movements of the ends of the arms 20A-20C, each collar has an inwardly depending cam 40U and 40L, respectively. These cams are captured in respective cam races 45U and 45L in translational cam members 47U and 47L which are rigidly secured to the mandrel 12. The races in the cam members 47U and L, in the preferred embodiment, have identical slopes of opposite hands relative to each other (cf. FIG. 4). The slopes are also constant in this embodiment, thereby producing equal arm/mandrel rotations for equal axial extensions of the arm ends as the respective cams 40U and 40L move through their corresponding races 45U and 45L.

The arms 20A-20C are also sufficiently transversely stiff to resist twisting spirally about the tool 10 during radial extension and retraction of the arms. Instead, the arms remain axially extended and aligned such that their ends, and the collars connected thereto, rotate about the tool substantially in unison. This synchronizes the end rotations of the arms and produces, for each radial extension thereof, a predetermined rotated arm end position for each end thereof. Of course, the particular axial movements of the arms are a function of the axial displacements of the ends thereof. Since these are controlled by the cam races, the axial displacments of the arms are in fact a defined result of the corresponding radial extensions thereof. (In practice, of course, the tool is more likely to rotate than the arms, as illustrated in FIGS. 1 and 2, due to the friction of the arms on the walls of the borehole or casing.)

Although the cam races in the preferred embodiment have constant, equal, and oppositely handed slopes, it is not necessary that they be equal, constant, or of opposite hands. For example, if the magnets 22 were located one third of the distance from collar 35U and two thirds of the distance from collar 35L, then the slope (with respect to the tool axis) of cam race 40U should be twice that of race 40L to prevent axial displacement of the centerline of the magnets as the effective diameter of the arms is changed. In that case, changes in the radial distance of the arms from the tool would cause the arm ends to move the cams 40U and L through the races 45U and L, resulting in relative rotation of the arms with respect to the tool 10. Due to the steeper slope of the race at the near end of the arms 20 relative to the magnets, that end would move axially at half the rate of the far end, maintaining the hypothetically eccentered magnets axially stationary. Accordingly, the precise axial position of any portion of each arm at any radial position can be controlled by the proper cam race configurations. In casing collar locators, such as illustrated herein, this can be a substantial advantage since the optimum tool performance results when the magnets and the bucking field they produce are constantly positioned directly over the centerline of the coil.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. For use in a borehold tool having at least one radially extendable and retractable outrigger arm, a displacement control mechanism for regulating and controlling the axial displacement of the outrigger arm relative to the tool as the arm's effective extension from the tool changes, comprising:
   (a) first and second securing means for securing the respective ends of the arm to the tool at axially displaced locations, said first and second securing means each including means providing for relative axial movement of its respective end of the arm in response to increases and decreases in the radial extension thereof,
   (b) said first and second securing means each including guide means for guiding said respective arm end axial movement and causing corresponding predetermined rotation thereof about the exterior of the tool according and in response to said axial movement, and
   (c) said arm being sufficiently transversely stiff to resist twisting spirally about the tool and to remain axially extended and aligned.

2. The mechanism of claim 1 wherein the tool includes a plurality of such outrigger arms.

3. The mechanism of claim 2 wherein said first and second securing means further comprise first and second respective collars mounted around the tool.

4. The mechanism of claim 3 wherein each of the arms is connected at its ends, respectively, to said first and second collars.

5. The mechanism of claim 1, 2, 3, or 4 wherein said guide means further comprise cam and race means, one mounted on the tool and the other moving with the end of the arm secured thereto, said cam being captured in said race to produce said predetermined rotation of the arm in response to said axial arm end movement.

6. The mechanism of claim 5 wherein said cam races are substantially identical to one another and of opposite hands to produce equal end displacements of the arm and maintain the mid-point of the arm at the same, single axial position along the tool independently of the radial extension thereof.

7. The mechanism of claim 5 wherein the tool includes at least one coil and the arms include a magnet assembly centered over said coil, said assembly having at least one magnet, and wherein said cam races have slopes adjusted to maintain said magnet assembly centered over said coil during radial extension and retraction thereof.

8. The mechanism of claim 7 wherein said magnet assembly is at the center of the arm and said cam race slopes are identical to one another and of opposite hands.

9. The mechanism of claim 8 wherein said cam race slopes are constant, producing equal rotations for equal axial extensions of the arm ends.

10. For use in a borehole tool having a plurality of radially extendable and retractable outrigger arms, a displacement control mechanism for regulating and controlling the axial displacement of the outrigger arms relative to the tool as the arms' effective extension from the tool changes, comprising:

(a) first and second collars mounted around the tool, said arms being connected to said collars at their respective ends for securing the respective ends of the arms to the tool at axially displaced locations, said collars including means providing for relative axial movement of at least one end of each arm in response to increases and decreases in the radial extension thereof, (b) a cam and race means for and associated respectively with each of said first and second collars, each said race being mounted on the tool and each said cam on the collar for moving with the end of the arm secured thereto, with said cam being captured in said race for guiding said arm end axial movement and causing and producing corresponding predetermined rotation thereof about the exterior of the tool according and in response to said axial arm end movements, and (c) the arms being sufficiently transversely stiff to resist twisting spirally about the tool and to remain axially extended and aligned such that the two ends of each arm rotate about the tool substantially in unison to synchronize the end rotations of the arms, and said cam races being identical to one another and of opposite hands to produce, for each radial extension of a particular arm, a predetermined rotated arm end position and equal and opposite end displacements for each end thereof, and corresponding related axial movements and displacements thereof, producing defined axial displacements of each arm for each radial extension thereof, thereby maintaining the mid-point of the arm at the same, single axial position along the tool independently of the radial extension thereof.

11. A displacement control method, for use with a borehole tool having at least one radially extendable and retractable outrigger arm, for regulating and controlling the axial displacement of the outrigger arm relative to the tool as the arm's effective extension from the tool changes, comprising:

(a) securing the respective ends of the arm to the tool at axially displaced locations, (b) axially moving at least one end of the arm relative to the tool in response to increases and decreases in the radial extension thereof, (c) guiding said arm end axial movement and causing corresponding predetermined rotation thereof about the exterior of the tool according and in response to said axial movement, and (d) synchronizing the rotations of the two ends of the arm about the tool to move them substantially in unison and produce, for each radial extension of the arm, a predetermined rotated arm end position for each end thereof, and corresponding related axial movements and displacements thereof, producing a defined axial displacement of the arm for each radial extension thereof.

12. The method of claim 11 wherein the tool includes a plurality of such outrigger arms.

13. The method of claim 12 wherein said securing step further comprises securing the respective ends of the arms with first and second respective collars mounted around the tool.

14. The method of claim 13 wherein each of the arms is connected at its ends, respectively, to the first and second collars.

15. The method of claim 11 further comprising forming and shaping the arms to be sufficiently transversely stiff to resist twisting spirally about the tool and to remain axially extended and aligned.

16. The method of claim 11, 12, 13, 14 or 15 wherein said guiding step further comprises producing the predetermined rotation of the arm in response to the axial arm end movement with a cam and race means, one mounted on the tool and the other moving with the end of the arm secured thereto, and the cam being captured in the race.

17. The method of claim 16 wherein the cam races are substantially identical to one another and of opposite hands to produce equal end displacements of the arm and maintain the mid-point of the arm at the same, single axial position along the tool independently of the radial extension thereof.

18. The method of claim 16 wherein the tool includes at least one coil and the arms include a magnet assembly centered over the coil, the assembly having at least one magnet, and further comprising adjusting the cam race slopes to maintain the magnet assembly centered over the coil during radial extension and retraction thereof.

19. The method of claim 18 wherein the magnet assembly is at the center of the arm and the cam race slopes are adjusted to be identical to one another and of opposite hands.

20. The device of claim 19 wherein the cam race slopes are constant, producing equal rotations for equal axial extensions of the arm ends.

21. A displacement control method, for use in a borehole tool having a plurality of radially extendable and retractable outrigger arms, for regulating and controlling the axial displacement of the outrigger arms relative to the tool as the arms' effective extension from the tool changes, comprising:

(a) securing the respective ends of the arms to the tool at axially displaced locations by connecting the arms at their respective ends to first and second collars mounted around the tool, (b) axially moving at least one end of each arm relative to the tool in response to increases and decreases in the radial extension thereof, (c) guiding said arm end axial movements and causing and producing corresponding predetermined rotations thereof about the exterior of the tool according and in response to said axial arm end movements, by associating the first and second collars with the respective cam and race means, mounting the race on the tool and the cam on the collar for moving with the end of the arm secured thereto, and capturing the cam in the race, (d) synchronizing the end rotations of the arms by assuring that the arms are sufficiently transversely stiff to resist twisting spirally about the tool and to remain axially extended and aligned such that the two ends of each arm rotate about the tool substantially in unison, and (e) producing, for each radial extension of a particular arm, a predetermined rotated arm end position and equal and opposite end displacements for each end thereof, and corresponding related axial movements and displacements thereof, by using cam races which are identical to one another and of opposite hands, to produce defined axial displacements of each arm for each radial extension thereof, thereby maintaining the mid-point of the arm at the same, single axial position along the tool independently of the radial extension thereof.

* * * * *